US008267285B2

(12) United States Patent
Cohen et al.

(10) Patent No.: US 8,267,285 B2
(45) Date of Patent: Sep. 18, 2012

(54) MICRODISPENSING PUMP

(75) Inventors: Ben Z. Cohen, New York, NY (US); Nigel B. Kelly, Rye Brook, NY (US)

(73) Assignee: Ben Z. Cohen, New York, NY (US)

( * ) Notice: Subject to any disclaimer, the term of this patent is extended or adjusted under 35 U.S.C. 154(b) by 0 days.

(21) Appl. No.: 12/649,991

(22) Filed: Dec. 30, 2009

(65) Prior Publication Data

US 2011/0006087 A1 Jan. 13, 2011

Related U.S. Application Data

(63) Continuation of application No. 10/123,390, filed on Apr. 16, 2002, now Pat. No. 7,651,011.

(60) Provisional application No. 60/284,157, filed on Apr. 16, 2001.

(51) Int. Cl.
*G01F 11/00* (2006.01)

(52) U.S. Cl. ................ 222/321.7; 222/321.2; 222/321.9

(58) Field of Classification Search ............... 222/321.9, 222/321.8, 321.1, 385, 341, 383.1, 321.2, 222/321.3, 321.7; 239/333
See application file for complete search history.

(56) References Cited

U.S. PATENT DOCUMENTS 3,223,292 A * 12/1965 Keeney et al. ............ 222/321.9
3,359,917 A * 12/1967 Cooprider ..................... 417/518
3,362,344 A * 1/1968 Duda ............................ 417/514
3,779,464 A 12/1973 Malone
3,949,910 A 4/1976 Focht
4,140,249 A * 2/1979 Majima ...................... 222/321.2
4,325,499 A 4/1982 Shay
5,152,435 A 10/1992 Stand et al.
5,392,962 A * 2/1995 Meshberg .................. 222/321.8
5,462,208 A 10/1995 Stahley et al.
5,579,958 A * 12/1996 Su .............................. 222/321.2
5,638,996 A 6/1997 Montaner et al.
5,649,649 A * 7/1997 Marelli ...................... 222/321.2
5,803,318 A 9/1998 Lina
5,842,605 A 12/1998 Lehmkuhl
5,881,956 A 3/1999 Cohen et al.
RE38,077 E 4/2003 Cohen et al.
7,651,011 B2 * 1/2010 Cohen et al. ............... 222/321.7

FOREIGN PATENT DOCUMENTS

WO 00/18679 4/2000
WO 01/14245 A1 3/2001

* cited by examiner

*Primary Examiner* — Frederick C. Nicolas
(74) *Attorney, Agent, or Firm* — Hoffmann & Baron, LLP

(57) ABSTRACT

Various pump features are provided. In a first aspect, a pump is provided having an actuator with a nozzle and a releasable cap having a first shield located to entrap a fixed volume of air about the nozzle. In a second aspect, a valve seat is located along a pump's internal fluid passage with deflectable spring arms extending therefrom that are-deflectable in response to movement of a check valve element. In a third aspect, a compliant shut-off valve feature is provided, wherein, a first end of a tubular piston is deflectable in response to interferingly engaging the head of the poppet. In a fourth aspect, a pump includes a pump inlet, and a reservoir having a first portion and a second well portion in open fluid communication. Fluid may be trapped within the well portion at various angular orientations of the pump.

5 Claims, 12 Drawing Sheets

MICRODISPENSING PUMP

CROSS REFERENCE TO RELATED APPLICATIONS

This application is a continuation of U.S. application Ser. No. 10/123,390, filed Apr. 16, 2002, now allowed, which claims priority of U.S. Provisional Application No. 60/284,157, filed Apr. 16, 2001, the entire contents of both cases being incorporated by reference herein.

BACKGROUND OF THE INVENTION

Microdispensing pumps are known in the prior art, such as those disclosed in U.S. Pat. No. 5,052,435, which issued Oct. 6, 1992; U.S. Pat. No. 5,881,956, which issued Mar. 16, 1999; and WIPO Published Patent Application No. WO 01/14245. The disclosures of these references are incorporated by reference herein in their respective entireties.

Although microdispensing pumps are known in the prior art, because of the minute doses of the pumps (5-15 microliters), microdispensing pumps have problems associated therewith not found with pumps used for larger dosages. For example, fluid residing within, or adjacent to, a nozzle may evaporate between doses, thereby altering the volume of a next-administered dose. With relatively large doses, typically in the range of 80-100 microliters, evaporation of such fluid is generally inconsequential in maintaining required dosage amounts. However, such evaporation may have an effect on microdoses.

Additionally, internal components of a microdispensing pump define a fluid passageway which requires relatively tight tolerances. Easier compliance with manufacturing stringency is desired with microdispensing pumps.

SUMMARY OF THE INVENTION

The problems noted above are addressed with a microdispensing pump formed in accordance with the subject invention. Different features of a microdispensing pump are described herein which may be used in various combinations, or each singularly, and also may be used in various pump applications, not limited to microdispensing pumps.

In a first aspect of the subject invention, an evaporation-reduction feature is provided, wherein a microdispensing pump having an actuator with a nozzle is provided with a releasable cap for selectively covering the actuator. The releaseable cap includes at least a first shield located to at least partially cover the nozzle with the cap covering the actuator such that the first shield entraps a fixed volume of air about the nozzle when at least partially covering the nozzle. Preferably, an annular rim extends about the nozzle formed to abut, or near abut, the front shield to cooperatively entrap the fixed volume of air. In this manner, evaporation of fluid from the nozzle is minimized, and ideally avoided. In a further preferred embodiment, a second shield may be formed on the cap for covering an accessway to the actuator necessary for operation of the pump.

In a second aspect of the subject invention, a check valve element return feature is provided, wherein a valve seat is located along the pump's internal fluid passage with a plurality of deflectable spring arms extending from the valve seat. A valve element, e.g., a ball check valve element, is disposed between the spring arms and the valve seat, with the spring arms being deflectable in response to movement of the check valve element away from the valve seat. Preferably, the spring arms urge the check valve element into sealing engagement with the valve seat. Upon sufficient fluid pressure, the check valve element is lifted from the valve seat causing deflection of the spring arms. Memory of the spring arms causes the check valve element to return to the valve seat and form a seal therewith.

In a third aspect of the subject invention, a compliant shut-off valve feature is provided, wherein, in one embodiment, a tubular piston is disposed about a poppet having an enlarged head formed at one end thereof. The head has a diameter greater than the diameter of a first end of the piston, and the first end of the piston is deflectable in response to interferingly engaging the head. As such, the first end of the piston is able to form a seal with the head upon engagement therewith. The seal is defined over a range of movement of the piston relative to the head. In this manner, sealing of the compliant shut-off valve is unrelated to limiting the upward travel of the piston.

In a fourth aspect of the subject invention, a fluid trapping well is provided, wherein a microdispensing pump includes a pump inlet, for example, at the end of a dip tube, and a reservoir having a first portion and a second well portion in open fluid communication. The well portion encompasses less volume than the first portion and is positioned such that the pump inlet is locatable in the well portion. In this manner, fluid may be trapped within the well portion at various angular orientations of the pump to communicate directly with the pump inlet. Because of the reduced volume of the well portion relative to the remainder of the reservoir, fluid may be maintained in communication with the pump inlet for a longer duration over various orientations of the pump, as compared to a typical cup-shaped reservoir used in the prior art. Such fluid being encouraged to reside in the well portion through capillary attraction between the fluid, the dip tube, and the well portion.

These and other features of the invention will be better understood through a study of the following detailed description and accompanying drawings.

DETAILED DESCRIPTION OF THE INVENTION

Figure 1:
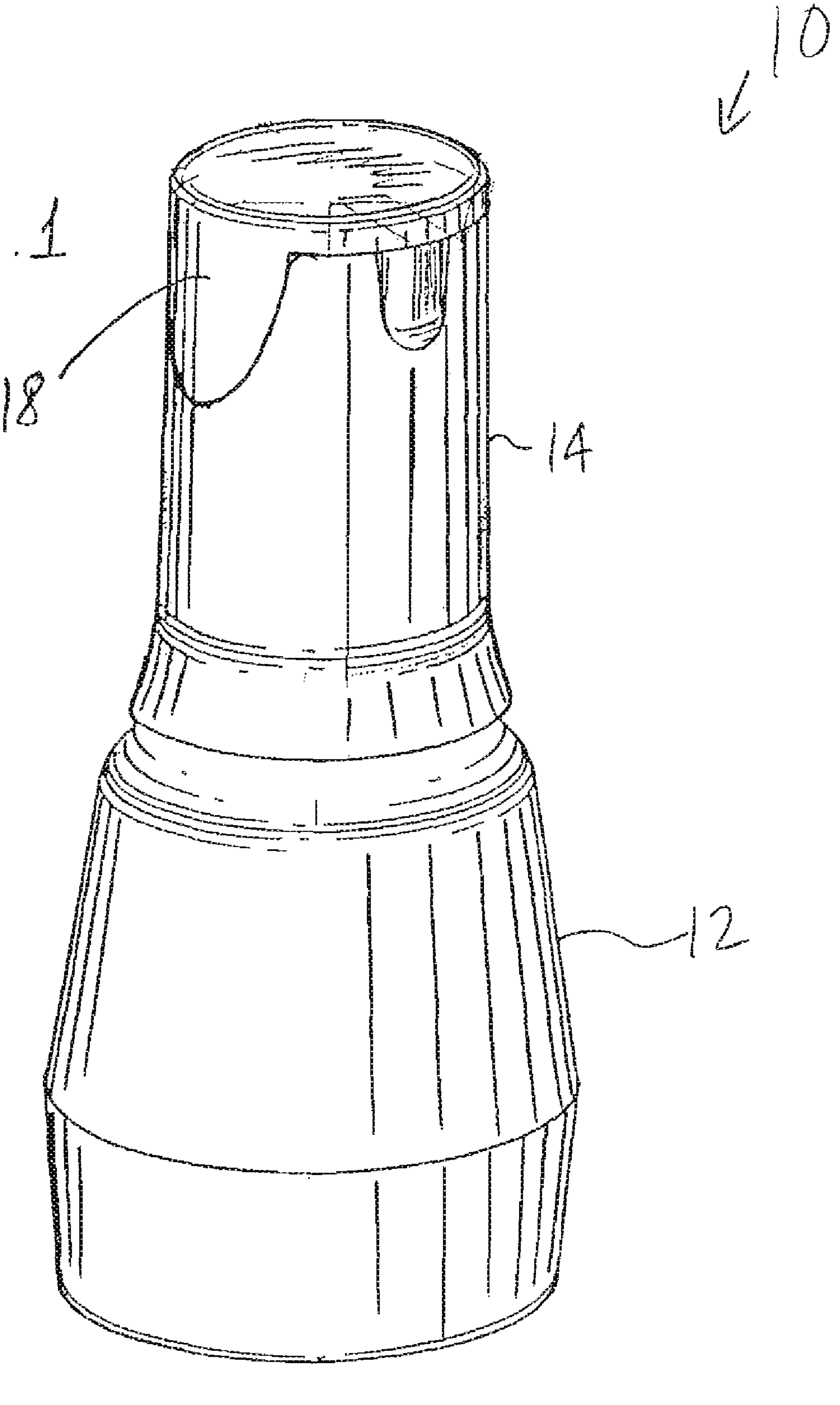
FIG. 1 is a perspective view of a pump formed in accordance with one or more aspects of the subject invention.

Various features of the pump are described herein which may be used singularly or in various combinations. These features can be used with known pump features, although the features are particularly well-suited for use in microdispensing pumps. To illustrate the various aspects of the subject invention, a representative pump and representative pump features are described herein and depicted in the drawings. It is to be understood that the particular pump and pump features are described and depicted for illustrative purposes only, and any pump configuration (and any configuration of pump features) may be used consistent with the principles described herein.

Figure 2:
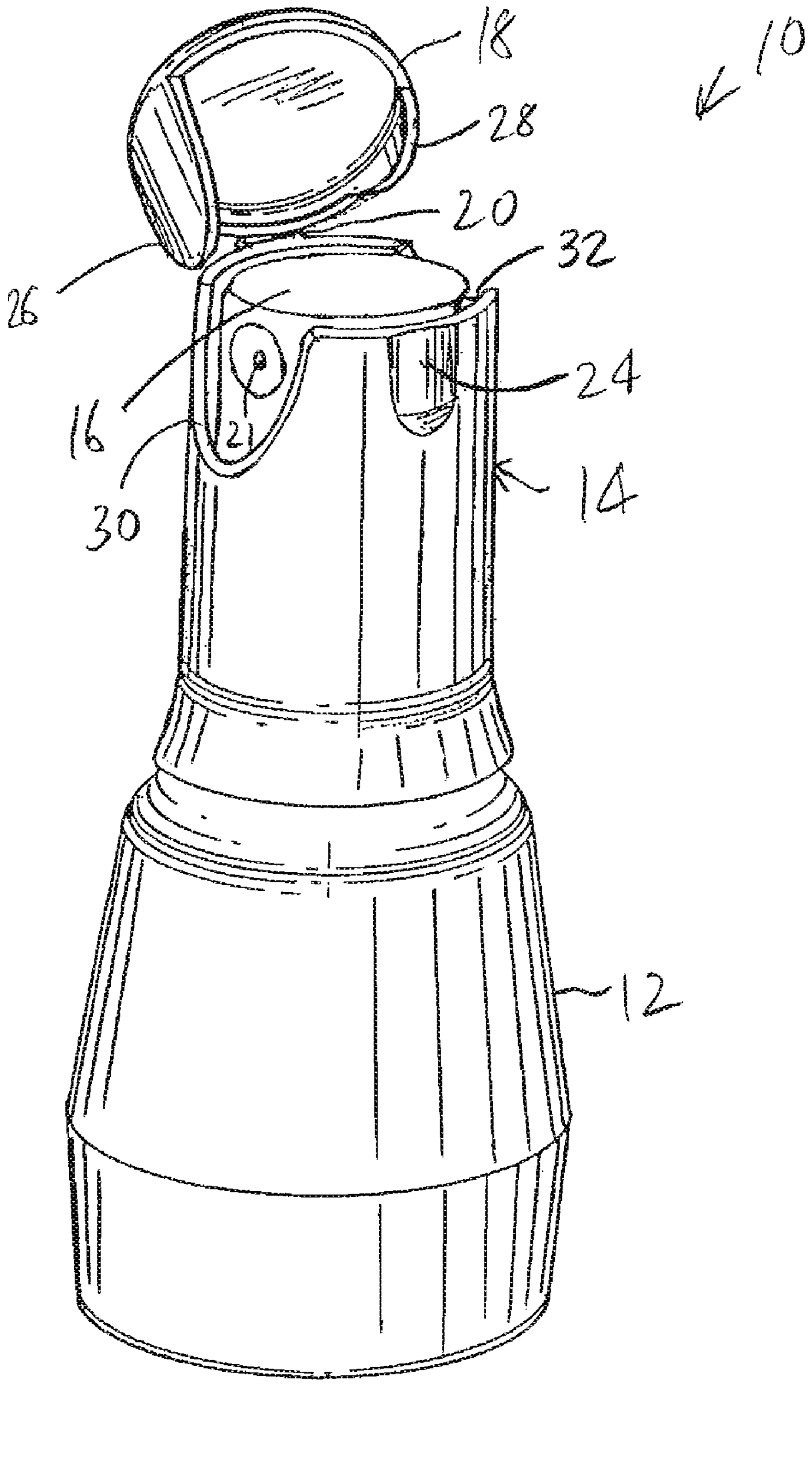
FIG. 2 is similar to FIG. 1 with the releasable cap in an open position.

With reference to FIGS. 1 and 2, a pump 10 is depicted for dispensing fluid, particularly ophthalmic fluid medication. The pump 10 generally includes a handle 12, a neck portion 14, an actuator 16 disposed within the neck portion 14 and a flip cap 18 hingedly mounted to the neck portion 14 via a hinge 20. A nozzle 21 is formed in the actuator 16 to dispense the fluid upon actuation of the dispenser; the actuation preferably being achieved by depressing the actuator 16 and causing downward travel thereof. The dispenser may be of a lift-pump type formed in accordance with the teachings set forth in U.S. Pat. No. 5,881,956; of a compression-pump type; or of any other type known to those skilled in the art. For clarity, the various aspects of the subject invention are discussed in turn, but are to be understood that these features may be used one or more in combination, or each singularly.

Evaporation-Reduction Feature

With reference to FIGS. 1-5, the hinge 20 is of any type known to those skilled in the art, including being integrally formed with the neck portion 14 and the flip cap 18. It is preferred that the cap 18 releasably engage the neck portion 14 to maintain a closed state with the pump 10 not being in use. To this end, a catch 22 may be provided which is inwardly deflectable to engage and bear against an inner surface of the neck portion 14 in a closed state, as shown in dashed lines in FIG. 4. The catch 22 is preferably located opposite the hinge 20. To facilitate release of the cap 18 from the neck portion 14, a notch 24 may be formed extending from an upper edge of the neck portion 14 such that a portion of a lower surface of the cap 18 is exposed in a closed state. This arrangement allows for force to be applied against the exposed portion of the cap 18 to lift the cap 18 up from the neck portion 14, thus releasing it from the neck portion 14. Optionally, a tab 25 may extend from the cap 18, as shown in dashed lines in FIG. 5, against which a user's finger may press to open the cap 18.

In a preferred embodiment, the hinge 20 has memory so that it springs open the cap 18 upon the cap 18 being separated from the neck portion 14. As will be appreciated by those skilled in the art, the catch 22 should have sufficient holding strength to overcome the memory of the hinge 20 when the cap 18 is closed. Alternatively, the hinge 20 can be formed as a true living hinge, without any memory.

As best shown in FIG. 2, the flip cap 18 is formed with two depending shield portions 26 and 28 which are preferably located diametrically opposite about the cap 18. The front shield portion 26 and the rear shield portion 28 need not be of equal length. Correspondingly, arcuate recesses 30 and 32 are formed in the neck portion 14 dimensioned to register with the shield portions 26 and 28, respectively. The front recess 30 is formed with sufficient depth to ensure that the nozzle 21 is exposed during a dispensing procedure, including taking into account any downward descent of the nozzle 21 upon actuation. The rear recess 32 is relatively shallow, yet provides an accessway to the actuator 16 to allow the finger of the user to move (e.g., depress) the actuator 16 without interference of the neck portion 14 during actuation. The length of the rear recess 32 is a function of the extent the actuator 16 must travel downwardly in dispensing fluid; in turn, downward travel of the actuator 16 is typically a function of a pump's piston stroke—a relatively short piston stroke will require a relatively short rear recess 32. Advantageously, the shield portions 26, 28 provide the pump 10 with an aesthetically-pleasing appearance, which is further enhanced by forming the cap 18 of transparent material. Transparent material adds to both the appearance and facilitates a user's ability to orient the pump 10 correctly before opening it (i.e., releasing the cap 18). The cap 18 may be formed of polypropylene.

Figure 3:
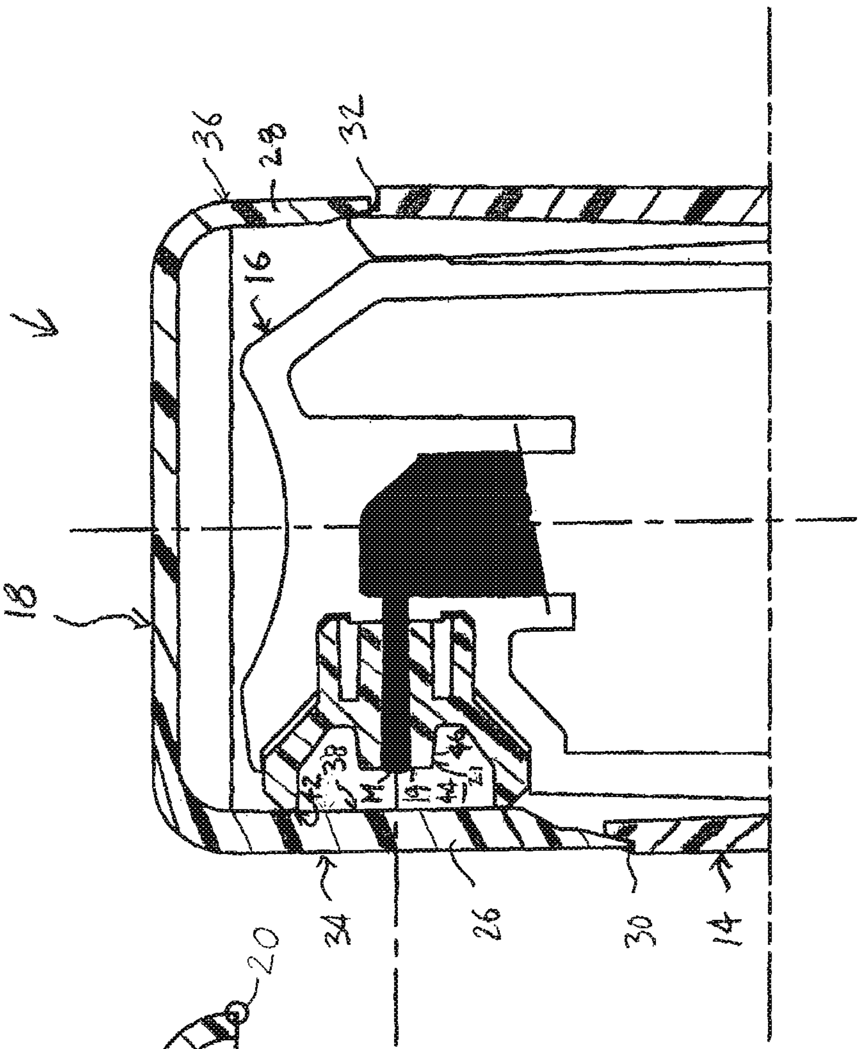
FIG. 3 is a schematic cross-sectional view with the releasable cap in a closed position.

The shield portions 26, 28 have arcuate outer surfaces 34, 36, respectively, which may be formed with the same degree of curvature as the neck portion 14 so as to define the appearance of the continuous cylinder (FIG. 1) with the cap 18 in a closed position. Preferably, the edges of the shield portions 26, 28 overlap, at least in part, the edges of the recesses 30, 32 to block the ingress of contaminants into the neck portion 14. For example, the edges of shield portions 26, 28 and the recesses 30, 32 may be cooperatively tapered, as shown in FIG. 3. The overlapping edges also properly locate the cap 18 relative to the neck portion 14, minimizing "free play" therebetween.

Figure 4:
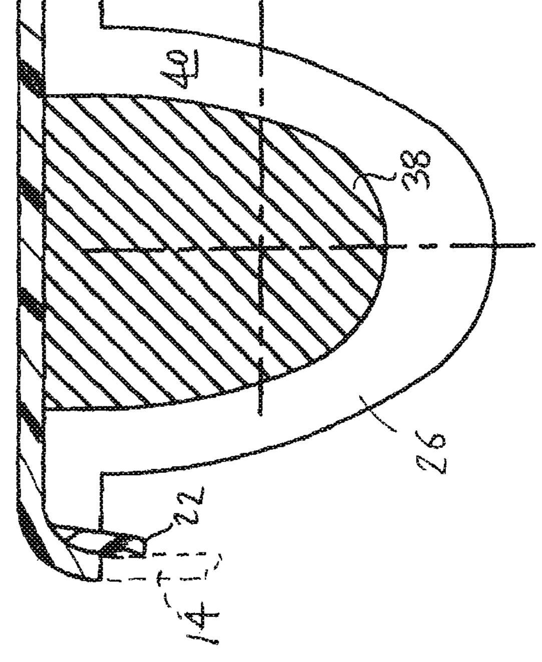
FIG. 4 is a cross-sectional view of the releasable cap taken along line 4-4 of FIG. 5.
Figure 5:
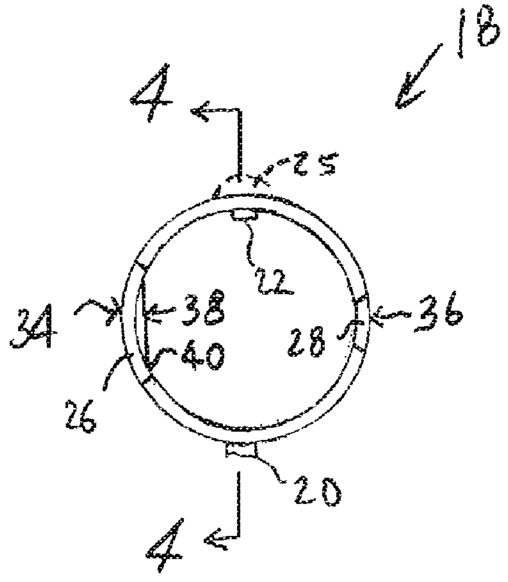
FIG. 5 is a bottom plan view of the releasable cap.

With reference to FIGS. 3-5, as an additional feature, a flat surface 38 (hatched in FIG. 4 for clarity) may be formed across an inner surface 40 of the front shield portion 26. As shown in FIG. 3, the flat surface 38 is formed to abut, or near abut, an annular front outer rim 42 of the nozzle 21, thereby entrapping a body of air which occupies void 44 about any fluid meniscus M of fluid remaining in the nozzle 21. Generally the meniscus M will come to rest, after a dispensing procedure, either level with a mouth 19 of the nozzle 21, or in proximity thereto. The mouth of the nozzle 21 is located at the center of a conical protrusion 46 projecting from an inner part of the nozzle 21.

The void 44 exists to provide space for any excess fluid to run away from the mouth 19 of the nozzle 21, thereby allowing the nozzle 21 to remain clean. In effect, the flat surface 38 acts as a lid on the void 44 to trap a body of air. The small entrapped body of air limits the evaporation of the fluid from the nozzle 21. In particular, the ability of the entrapped body of air to accommodate humidity, which causes evaporation of the fluid, is limited. A point is reached where the entrapped air becomes saturated and evaporation ceases. More generally, the shields 26, 28 restrict moisture into the neck portion 14 through the recesses 30, 32, which are necessary for proper operation of the pump 10 (i.e., exposure of the nozzle 21; and accessway to the actuator 16).

It has been found that leaving the nozzle 21 exposed to ambient air, without any attempt to control the volume of air available to nozzle 21, results in much greater evaporation from the nozzle 21 than with the inventive arrangement described herein. Controlling evaporation is critical to ensuring that a first dose administered by the pump 10 after a period of rest is not deficient due to the evaporation effects at the nozzle 21. With the use of the shields 26, 28, air flow into the neck portion 14 below the cap 18 and about the actuator 16, is limited. The use of the flat surface 38 enhances the ability to restrict air flow to the nozzle 21.

Check Valve Element Return Feature

Figure 7:
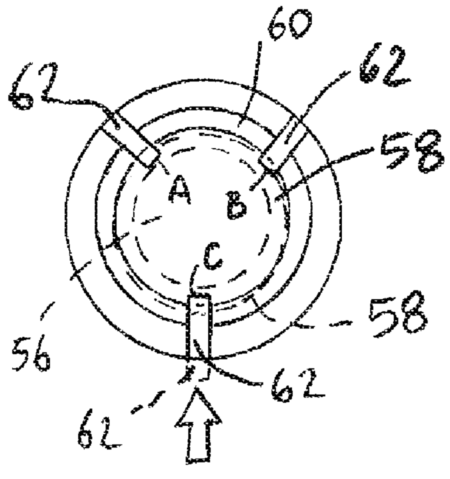
FIG. 7 is a top plan view of a possible arrangement of the spring arms and the check valve element.
Figure 6:
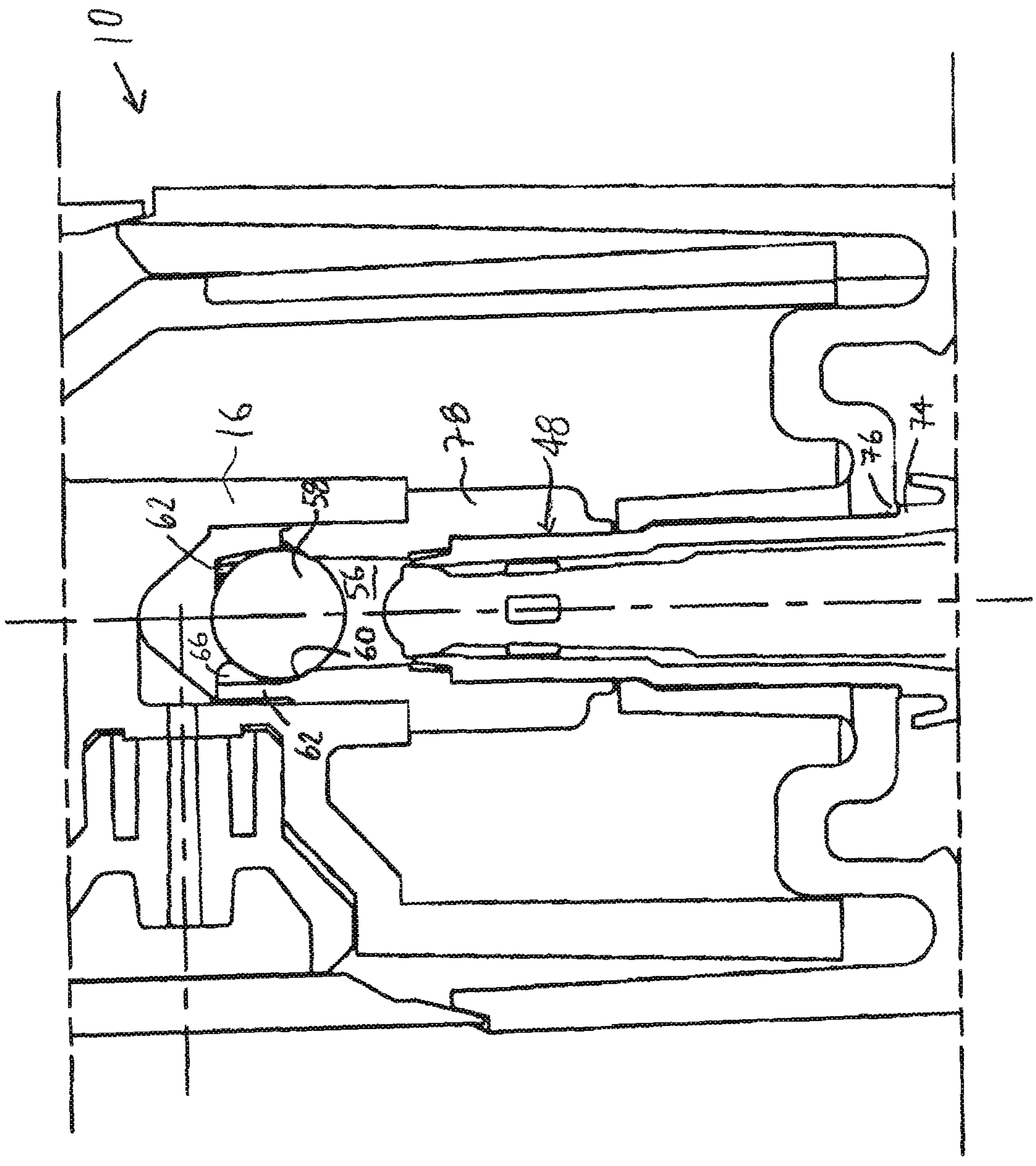
FIG. 6 is a schematic of a check valve element disposed between spring arms and a valve seat in accordance with a check valve element return aspect of the subject invention.
Figure 8:
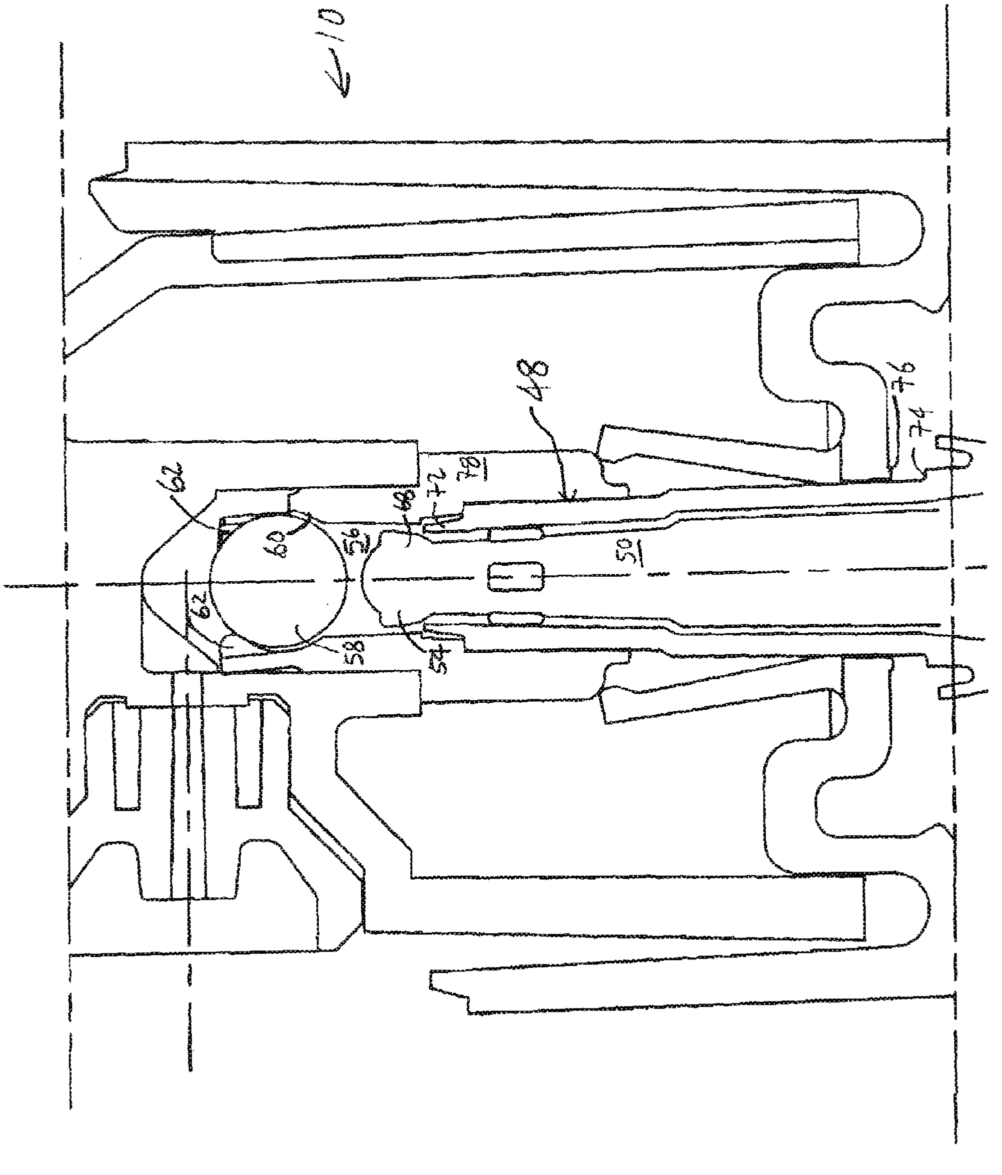
FIG. 8 is a schematic with the check valve element separated from the valve seat and the compliant shut-off valve open.

With reference to FIGS. 6-8, a check valve element return aspect of the subject invention is depicted which may be used in various pump structures, both in an inlet check valve application or as an outlet check valve application. The check valve element return arrangement can be placed along any location in a fluid pathway of a pump. To illustrate this aspect of the subject invention, reference is made to FIGS. 6-8, wherein a fluid passage 56 is defined to extend from a tubular piston 48 into the actuator 16. The flow of fluid passing through the fluid passage 56 is regulated by a check valve element 58, which is preferably a ball check valve element. A valve seat 60 is defined to cooperate with the check valve element 58 and to form a seal therewith.

A plurality of deflectable spring arms 62 extends from the valve seat 60 to limit the travel of the check valve element 58 away from the valve seat 60. Preferably, three of the spring arms 62 are provided, and more preferably, the spring arms 62 are equally spaced about the valve seat 60 (e.g., with three of the spring arms 62, the spring arms 62 would be spaced 120° apart). The spring arms 62 are cantilevered to the valve seat 60 so as to be outwardly deflectable upon upward movement of the check valve element 58. Spring arms 62 are formed with sufficient stiffness to limit the travel of the check valve element 58. In addition, the deflection of the spring arms 62 generates return spring force which urges the check valve element 58 to return to the valve seat 60. It is preferred that the spring arms 62 be formed of polypropylene. It is preferred that the spring arms 62 be in continuous contiguous contact with the check valve element 58.

The spring arms 62 are shown to have a general hook shape. The spring arms 62 may be formed with any shape wherein portions of the spring arms 62 are located above the check valve element 58 so as to restrict movement thereof away from the valve seat 60 as described below (e.g., the spring arms 62 may be slanted plank-shaped members). The spring arms 62 are preferably identically or substantially identically formed.

Upon actuation of the pump 10, fluid is pressurized and forces the check valve element 58 to separate from the valve seat 60, thereby allowing the fluid to continue traveling through the fluid passage 56. The check valve element 58 presses against the spring arms 62 and, under internal pressure of the fluid, moves away from the valve seat 60 and causes deflection of the spring arms 62 (FIG. 8). As the fluid travels past the check valve element 58, internal pressure of the fluid decays and eventually the return spring force of the spring arms 62 urges the check valve element 58 towards the valve seat 60, and preferably into contact with the valve seat 60 so as to form a seal therewith. The spring arms 62 are formed with inherent memory which tends to return the spring arms 62 to their original positions.

Advantageously, the spring arms 62 provide a centralizing effect in urging the check valve element 58 into contact with the valve seat 60. In particular, the extent each of the spring arms 62 is deflected is proportional to the amount of return spring force provided by each of the respective spring arms 62. For example, with reference to FIG. 7, if the check valve element 58 drifts toward one of the spring arms 62 and causes more deflection thereof as compared to the other spring arms 62, that spring arm 62 will provide a greater spring return force than the other spring arms 62, as designated by the arrow. The additional return spring force will compensate for the drift. With the other spring arms 62 also providing return spring force, the spring arms 62 collectively cause the check valve element 58 to be centralized relative to the valve seat 60. To further enhance the centralizing effect, the spring arms 62 are preferably each formed with an enlarged free end 66 with the enlarged portion extending inwardly (FIG. 6).

In a preferred arrangement, free ends of the spring arms 62 define a locus of spaced-apart points, A, B, C, which define an area smaller than the diameter of the check valve element 58. In this manner, passage of the check valve element 58 through the spring arms 62 is restricted.

Compliant Shut-Off Valve Feature

With respect to a third aspect of the subject invention, a shut-off valve feature is provided which operates over a range of positions of a pump's piston, thereby separating control of the end of stroke of the piston from control of sealing a fluid passage. Separating control in this way allows piston upward travel to be controlled at a lower point on the piston, and, therefore, is subject to reduced manufacturing tolerance variations bringing improved accuracy.

Figure 9:
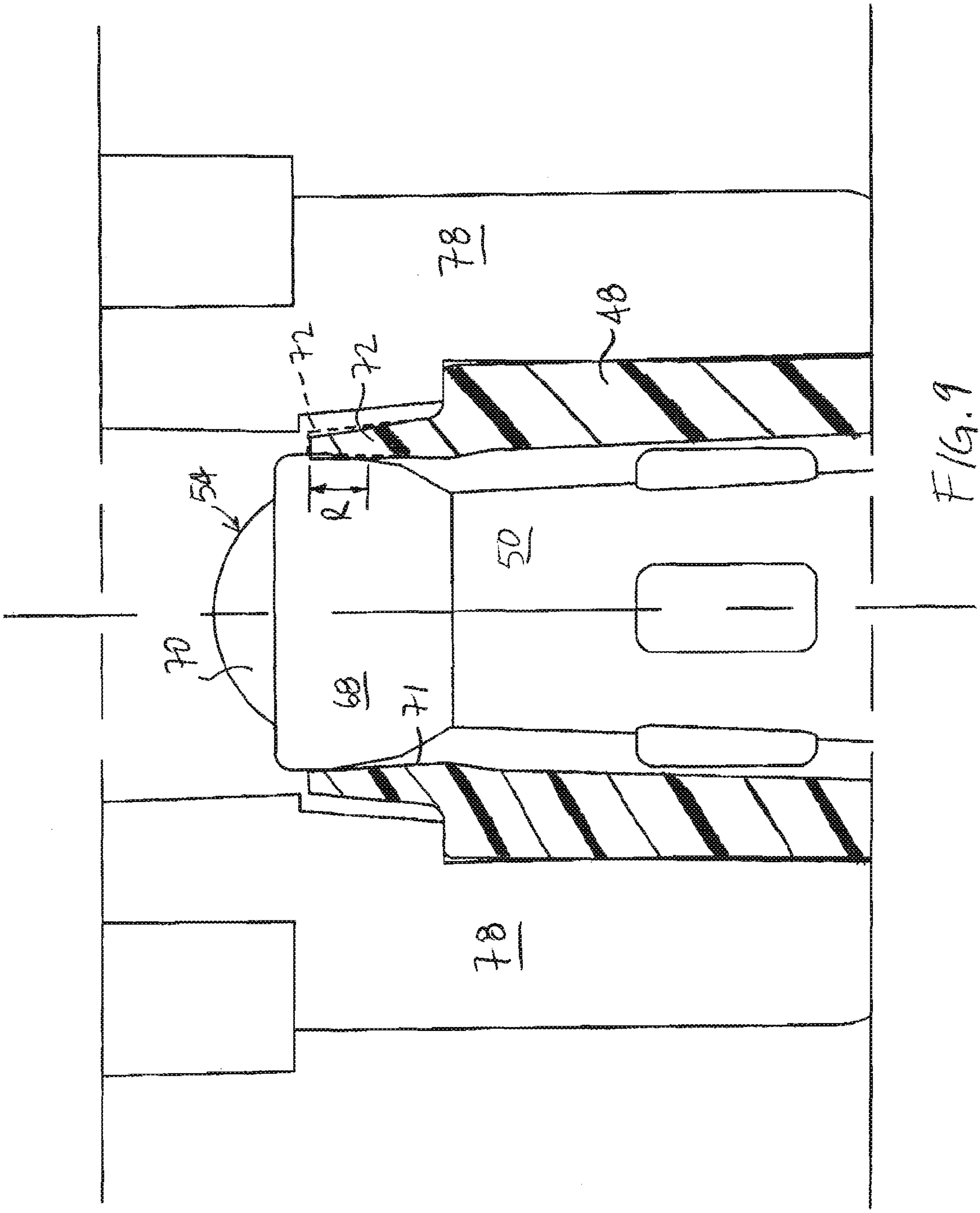
FIG. 9 is a partial cross-sectional view of a compliant shut-off valve aspect of the subject invention.
Figure 10:
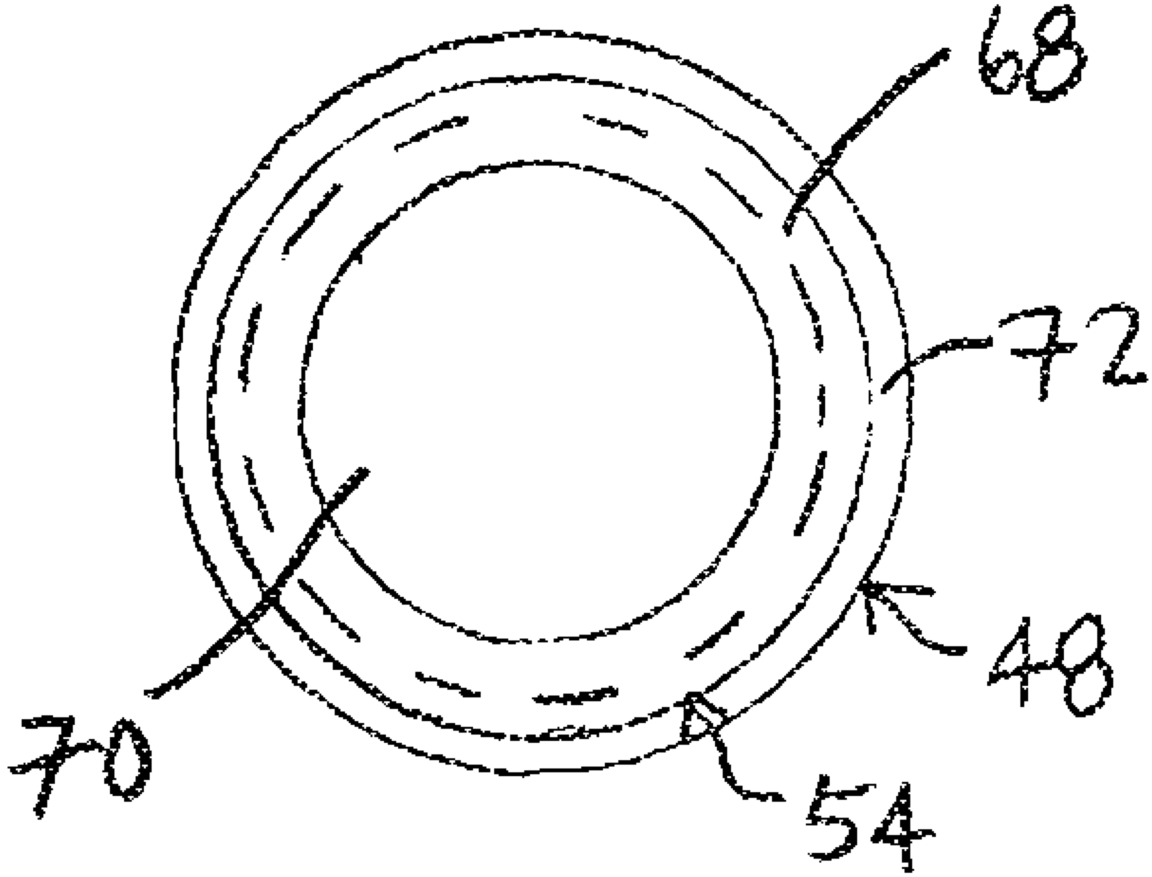
FIG. 10 is a top plan view of the arrangement of FIG. 9.

To illustrate this aspect of the invention, reference is made to FIGS. 6, 9 and 10. Although a specific structure of a poppet and piston are depicted and described herein, any structural arrangement may be used which is consistent with the principles herein.

FIG. 9 is an enlarged view of a head 54 of a poppet 50, also shown in FIG. 6. Preferably, the head 54 is formed with a large arcuate portion 68 and a smaller arcuate portion 70, with the radius of the large portion 68 being greater than the radius of the small hemispherical portion 70. For reduction of fluid drag, the smaller arcuate portion 70 is preferably hemispherical (i.e., generated about a single radius).

The tubular piston 48 is formed with a deflectable, annular collar 72 at one end thereof, preferably having a wall thickness less than that of adjacent portions. The collar 72 has a smaller diameter than the head 54 (particularly the arcuate portion 68) and is dimensioned for an interference fit about the head 54 (thereby resulting in the outward deflection of the collar 72), as shown in FIGS. 9 and 10. It is preferred that inner surface 71 of the piston 48 on, or in proximity to, the collar 72 interferingly engage the head 54.

The piston 48 is shown to be disposed about a portion of the poppet 50. Beneficially, the piston 48 provides a centralizing effect to the head 54.

Upon the piston 48 translating the furthest upward extent of its stroke, the collar 72 engages the head 54 and deflects about it. The piston 48 may be urged by a biasing device (not shown) upwardly and into engagement with the head 54. The deflection of the collar 72 causes a hoop stress to be generated in the collar 72, resulting in tight engagement of the collar 72 with the head 54. Advantageously, the tight engagement of the collar 72 about the head 54 is over a length of sliding movement of the piston 48 with a seal being formed at any point over a range of positions R—the defined seal acts as a shut-off valve which stops the flow of fluid about the head 54. As shown in FIG. 8, upon a downward stroke of the piston 48, the collar 72 disengages from the head 54, thereby allowing fluid to flow past the head 54.

With reference to FIG. 6, the upward stroke of the piston 48 is limited by the interengagement of at least one shoulder 74 formed on the piston 48, and at least one stop 76 formed on a portion of the pump 10. The upward movement of the piston 48 is provided by a biasing device (e.g., a coil spring) which is not shown. In the configuration shown in the drawings, the piston 48 is fixed (e.g., by an interference fit) to a valve housing 78, which, in turn, is fixed to the actuator 16. Accordingly, the piston 48, the valve housing 78, and the actuator 16 move in unison. The piston 48 is urged downwardly by depression of the actuator 16.

By spacing the collar 72 from the shoulder 74, advantageously, the limit on the upward stroke of the piston 48 is separately established from the shut-off valve, and is thereby controlled over a shorter distance relative to the downward stroke of the piston 48. Controlling the piston stroke over this shorter distance enables the individual components which cooperate to effect the upward and downward limits of travel of the piston to be manufactured to tighten limits, and therefore, a smaller variation in dose accuracy is maintained. With the subject invention, the collar 72 allows the shut-off valve to be defined over a range of piston movement, thus, reducing reliance on manufacturing within tolerances.

To allow for proper operation of the pump 10, the collar 72 should be formed sufficiently resilient to repeatedly engage the head 54 interferingly without losing the ability to form a seal with the head 54. To this end, the collar 72 may be formed of polyethylene, while the head is formed of polypropylene.

Fluid Trapping Device

In a fourth aspect of the subject invention, it is desired to maximize the ability to maintain fluid stored in a reservoir in fluid communication with an inlet of the pump. Particularly, with the pump 10 dispensing microdoses (5-15 microliters), it is desired to maintain a constant supply of fluid to the pump to minimize the ingress of air into the pump, especially after priming. With microdoses, air bubbles may not only disrupt the dosage volume, but even cause stalling.

Figure 11:
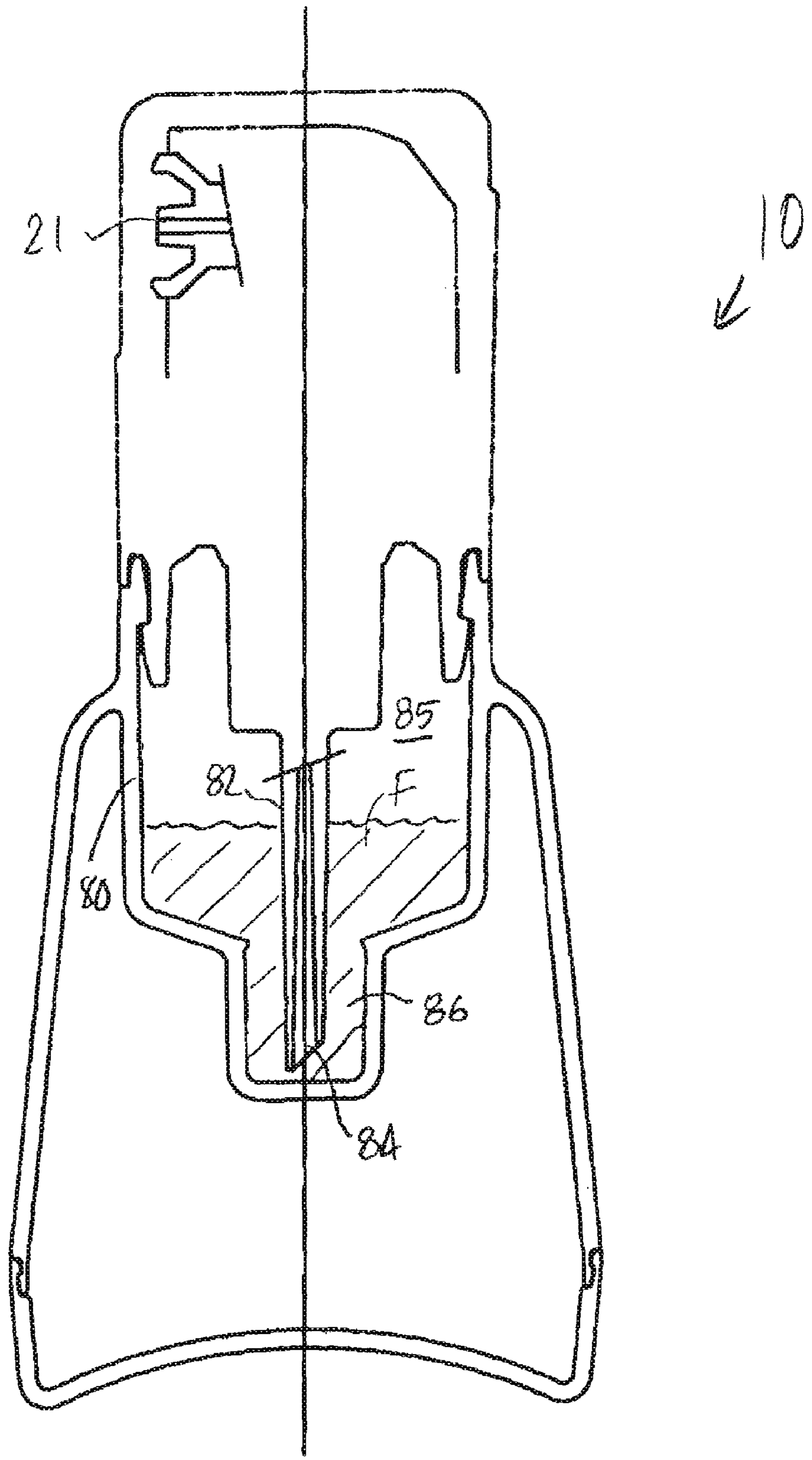
FIGS. 11-14 are schematics of different embodiments of a fluid-trapping device aspect of the subject invention.
Figure 12:
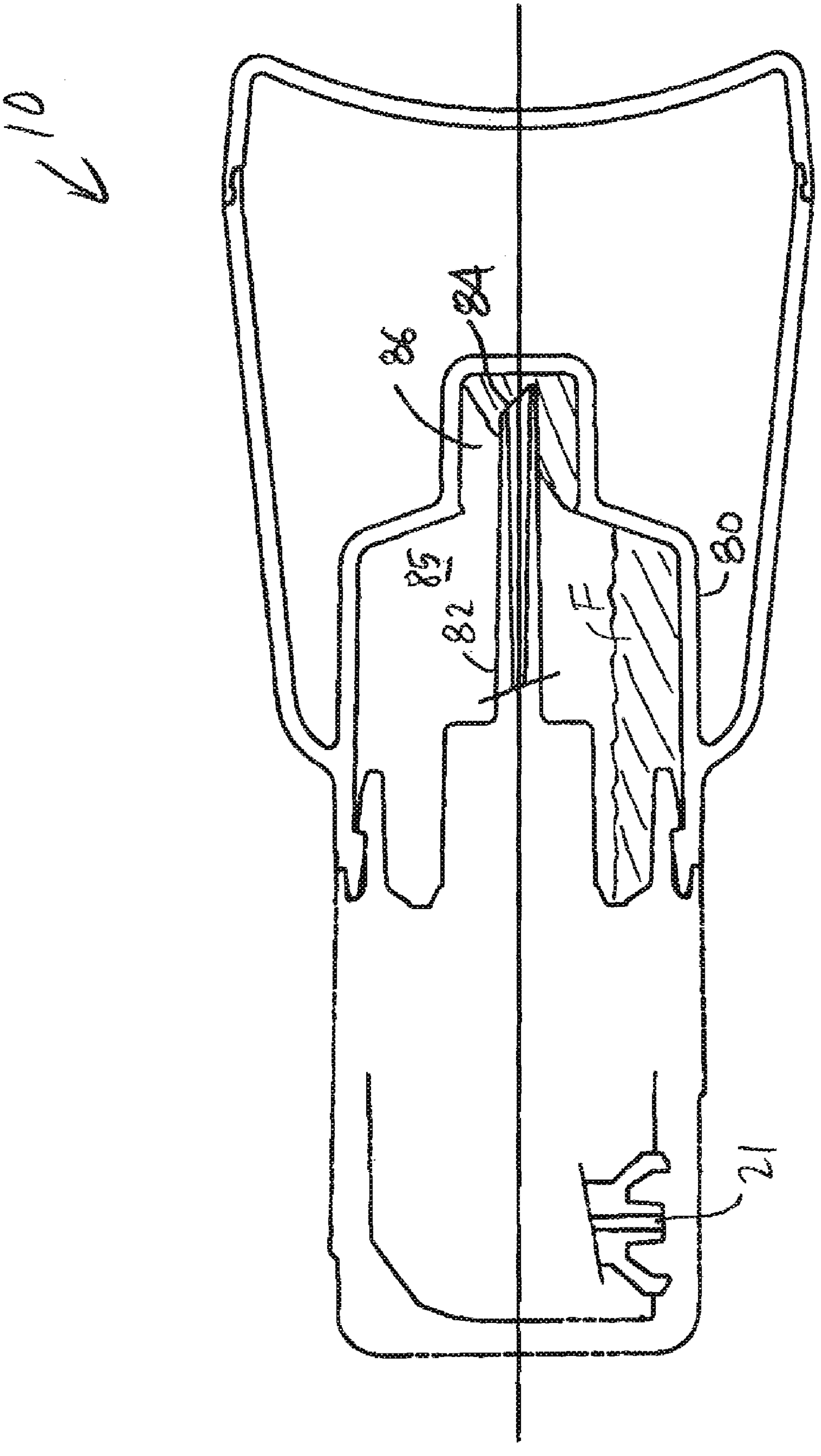

With reference to FIGS. 11-14, the pump 10 is formed with a reservoir 80 that contains fluid F. The fluid F may be drawn via a dip tube 82 or other structural element having a fluid inlet 84. With the pump 10 being in a vertical position (relative to gravitational orientation) as shown in FIG. 11, the fluid inlet 84 of the dip tube 82 is locatable within the fluid F. To ensure the fluid inlet 84 is continuously submerged, the reservoir 80 is formed with a first portion 85 and a second well portion 86 in open fluid communication. The well portion 86 is preferably located gravitationally below the first portion 85 and encompasses less volume than the first portion 85. As shown in FIG. 12, the dip tube 82 is extendable into the well portion 86, wherein the well portion 86 retains the fluid F with the pump 10 being in a non-vertical position, including a fully horizontal position. Specifically, the depth of the well portion 86, as well as, the capillary attraction between the fluid F, the dip tube 82, and the well portion 86, will coact to retain the fluid F in various angular orientations of the pump 10. In addition, it is preferred that the well portion 86 be sized to retain at least one dose, more preferably at least five doses, of the fluid F to reduce the possibility of drawing air into the pump 10.

The well portion 86 acts to temporarily retain the fluid F and is not a permanent reservoir. In addition, the well portion 86 cannot compensate for all angular orientations of the dispenser 10, especially where the dispenser 10 is inverted with the reservoir 80 being at least partially located gravitationally above the nozzle 21.

It is preferred that the fluid inlet 84 of the dip tube 82 be beveled and oriented away from the nozzle 21 so as to encourage any air bubbles that are evacuated from the dip tube 82 during initial priming to break away cleanly from the dip tube 82 and not adhere onto the fluid inlet 84 of the dip tube 82.

Figure 13:
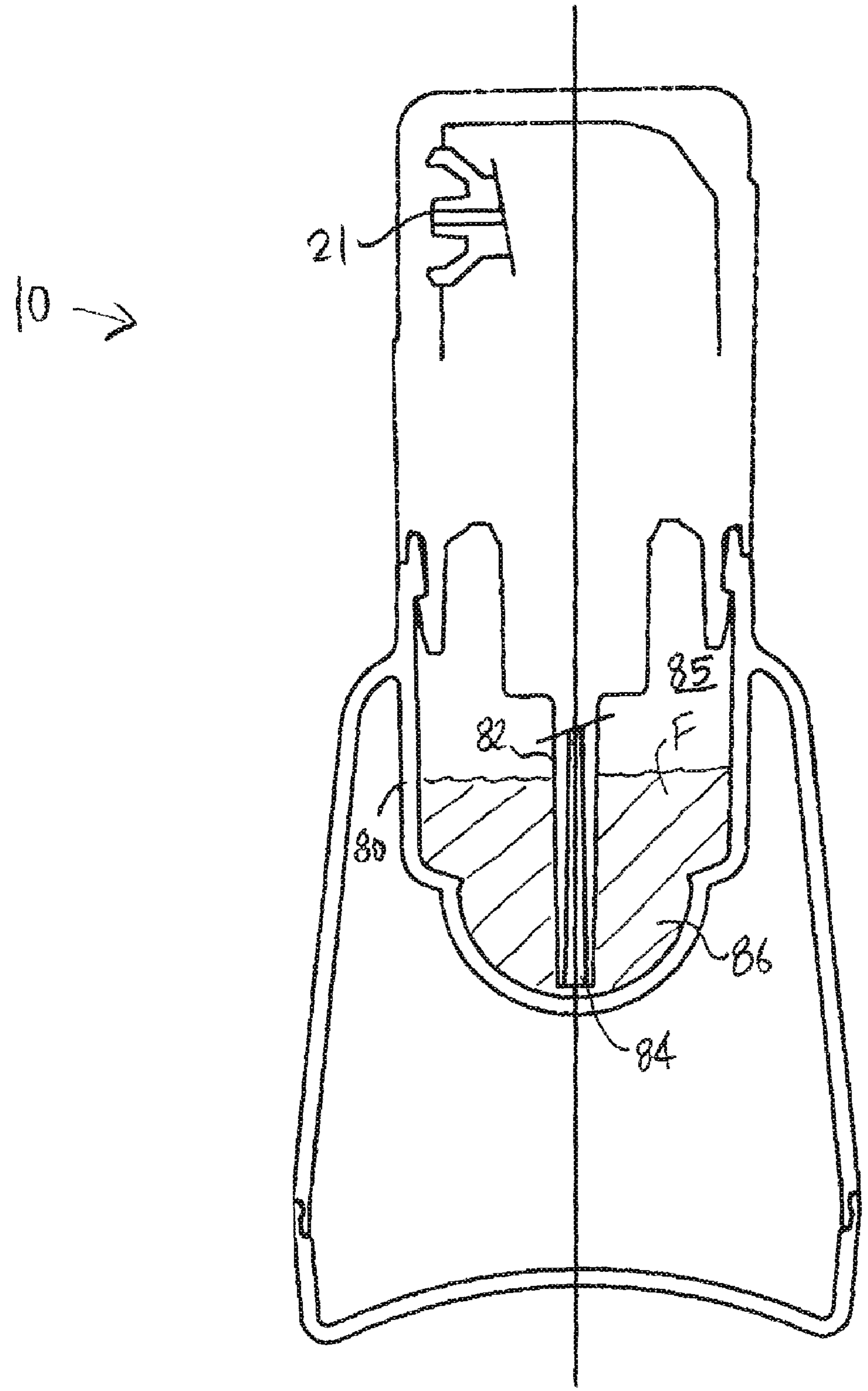
Figure 14:
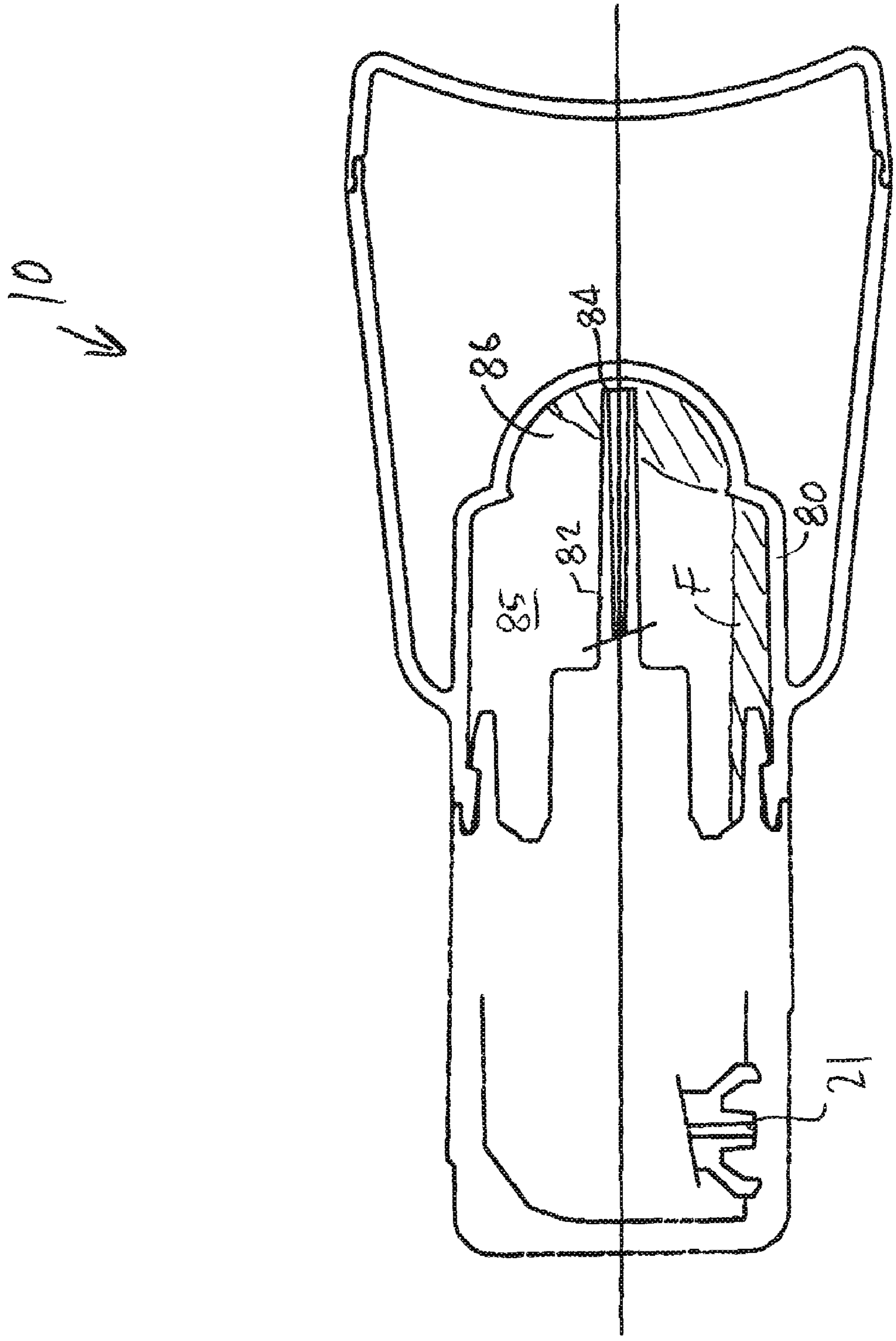

FIGS. 11 and 12 depict the well portion 86 as cylindrical. Other forms are possible. For example, FIGS. 13 and 14 show a second embodiment of the reservoir 80, wherein the well portion 86 is concave.

Various changes and modifications can be made to the present invention. It is intended that all such changes and modifications come within the scope of the invention as set forth in the following claims.

What is claimed is:

1. A pump comprising:

a tubular piston having first and second ends and inner and outer surfaces extending therebetween, wherein said first end of said piston is formed with a first wall thickness between said inner and outer surfaces, said piston including a second portion in proximity to said first end formed with a second wall thickness between said inner and outer surfaces, said second wall thickness being greater than said first wall thickness, and said piston including a shoulder located between said first end and said second portion, said shoulder defining a surface disposed transversely to said inner surface; and a poppet having an enlarged head, said head having a diameter greater than the diameter of said first end of said piston, wherein, said first end of said piston being deflectable in response to said inner surface interferingly engaging said head so as to define a seal therewith.

2. A pump as in claim 1, wherein, said inner surface of said piston on, or in proximity to, said first end interferingly engages said head.

3. A pump as in claim 1, wherein said head includes a first arcuate portion, said first end of said piston interferingly engaging said first arcuate portion.

4. A pump as in claim 3, wherein said head includes a second arcuate portion extending from said first arcuate portion.

5. A pump as in claim 1, wherein said piston further includes a shoulder for engaging a portion of the pump and for limiting the extent of movement of said piston, said shoulder being spaced from said first end of said piston.

* * * * *